(12) United States Patent
Park et al.

(10) Patent No.: US 11,342,565 B2
(45) Date of Patent: May 24, 2022

(54) FUEL CELL CATALYST AND MANUFACTURING METHOD THEREOF

(71) Applicant: KOREA INSTITUTE OF SCIENCE AND TECHNOLOGY, Seoul (KR)

(72) Inventors: Hee-Young Park, Seoul (KR); Jong Hyun Jang, Seoul (KR); Hyean-Yeol Park, Daejeon (KR); Jea-Woo Jung, Seoul (KR); Katie Heeyum Lim, Seoul (KR); Hyoung-Juhn Kim, Seoul (KR); Dirk Henkensmeir, Seoul (KR); Sung Jong Yoo, Seoul (KR); Jin Young Kim, Seoul (KR); Hyun Seo Park, Seoul (KR); So Young Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 138 days.

(21) Appl. No.: 16/841,371

(22) Filed: Apr. 6, 2020

(65) Prior Publication Data
US 2021/0020954 A1 Jan. 21, 2021

(30) Foreign Application Priority Data

Jul. 15, 2019 (KR) .......................... 10-2019-0085149

(51) Int. Cl.
H01M 4/92 (2006.01)
H01M 8/1004 (2016.01)
H01M 4/88 (2006.01)

(52) U.S. Cl.
CPC .......... *H01M 4/921* (2013.01); *H01M 4/881* (2013.01); *H01M 4/926* (2013.01); *H01M 8/1004* (2013.01)

(58) Field of Classification Search
None
See application file for complete search history.

(56) References Cited

FOREIGN PATENT DOCUMENTS

| KR | 20150105742 A | * | 9/2015 | ......... C07K 16/2896 |
| KR | 1020150105742 A | | 9/2015 | |
| KR | 10-1641145 B1 | | 7/2016 | |

OTHER PUBLICATIONS

Adriano M. Luchi et al., "Halogen bonding in biological context: a computational study of D2 dopamine receptor", DOI: 10.1002/poc. 3586.

* cited by examiner

*Primary Examiner* — Daniel S Gatewood
(74) *Attorney, Agent, or Firm* — Rabin & Berdo, P.C.

(57) ABSTRACT

The present disclosure relates to a fuel cell catalyst and a manufacturing method thereof. The fuel cell catalyst can be used to manufacture a membrane electrode assembly having a catalyst layer of high density and high dispersion by solving the problem of aggregation of catalyst particles occurring during the formation of the catalyst layer, by using a catalyst including a polydopamine-coated support. In addition, the method for manufacturing the fuel cell catalyst does not require a solvent because the catalyst including the polydopamine-coated support, wherein from 0.1 to 1% of the hydroxy groups contained in catechol groups of the polydopamine are replaced by halide atoms, in solid phase are simply heat-treated by solid-to-solid dry synthesis which allows manufacturing of a fuel cell catalyst in a short time by eliminating the need for a washing process using a solvent and an extraction process for sampling after the synthesis.

8 Claims, 11 Drawing Sheets

FUEL CELL CATALYST AND MANUFACTURING METHOD THEREOF

CROSS-REFERENCE TO RELATED APPLICATIONS

This application claims, under 35 U.S.C. § 119, the priority of Korean Patent Application No. 10-2019-0085149 filed on Jul. 15, 2019 in the Korean Intellectual Property Office, the disclosure of which is incorporated herein by reference in its entirety.

TECHNICAL FIELD

The present disclosure relates to a fuel cell catalyst and a manufacturing method thereof.

BACKGROUND

A fuel cell is a system which converts the chemical energy of a fuel into electrical energy. It uses hydrogen gas produced from reforming of a hydrocarbon such as methanol or ethanol or from hydrolysis of water and oxygen gas in the atmosphere as fuels. Since electricity is produced from electrochemical reactions whereby water is formed from the reaction between hydrogen and oxygen, the fuel cell is a clean energy source exhibiting higher power output and conversion efficiency as compared to the existing internal combustion engines.

The fuel cell is operated by various electrochemical reactions and various types of catalysts are used to facilitate the electrochemical reactions. As the catalysts, transition metals wherein the d orbital is filled partly or completely with electrons. The most representative fuel cell catalyst is platinum (Pt). Platinum has the highest activity for electrochemical reactions of all fuel cells, but it is expensive and the reserves are limited. In order to solve these disadvantages of the platinum catalysts, researches for improving catalytic activity have been conducted for longer than a decade.

For example, researches are conducted on preparation of catalysts wherein a large quantity of platinum catalysts are dispersed uniformly on a polydopamine-coated support in order to increase the mass activity of the platinum catalysts. However, the use of the polydopamine-coated support is problematic in that aggregation of catalyst particles occurs during the formation of a catalyst layer of a membrane electrode assembly due to the adhesivity of polydopamine, which results in nonuniform coating. The nonuniform catalyst layer hinders gas supply, proton ion transfer and water discharge in an electrode layer, consequently lowering the activity of the membrane electrode assembly.

REFERENCES OF THE RELATED ART

Patent Documents

Korean Patent Registration No. 10-1641145.

SUMMARY

The present disclosure is directed to providing a fuel cell catalyst with remarkably increased oxygen reduction reaction activity and mass activity, in order to achieve high supporting and high dispersion of an active metal and prevent aggregation during formation of a catalyst layer of a membrane electrode assembly, and a manufacturing method thereof.

In an aspect, the present disclosure provides a fuel cell catalyst including particles of a platinum-transition metal alloy supported on a polydopamine-coated support, wherein the polydopamine includes catechol groups containing two hydroxyl groups and some of the catechol groups of the polydopamine are replaced by halogen atoms.

In another aspect, the present disclosure provides a method for manufacturing a fuel cell catalyst, which includes: a step of pulverizing and mixing a catalyst including a polydopamine-coated support and a halide in solid phase; and a step of heat-treating the catalyst including the polydopamine-coated support and the halide in solid phase, which have been pulverized and mixed.

In another aspect, the present disclosure provides a membrane electrode assembly including the fuel cell catalyst.

In another aspect, the present disclosure provides a fuel cell including the membrane electrode assembly.

The fuel cell catalyst of the present disclosure can be used to manufacture a membrane electrode assembly having a catalyst layer of high density and high dispersion by solving the problem of aggregation of catalyst particles occurring during the formation of the catalyst layer, by using a catalyst including a polydopamine-coated support.

In addition, the method for manufacturing a fuel cell catalyst of the present disclosure does not require a solvent because the catalyst including the polydopamine-coated support and the halide in solid phase are simply heat-treated by solid-to-solid dry synthesis and allows manufacturing of a fuel cell catalyst in short time because a washing process using a solvent and an extraction process for sampling are unnecessary after the synthesis.

DETAILED DESCRIPTION OF EMBODIMENTS

Hereinafter, various aspects and exemplary embodiments of the present disclosure are described in more detail.

Figure 9:
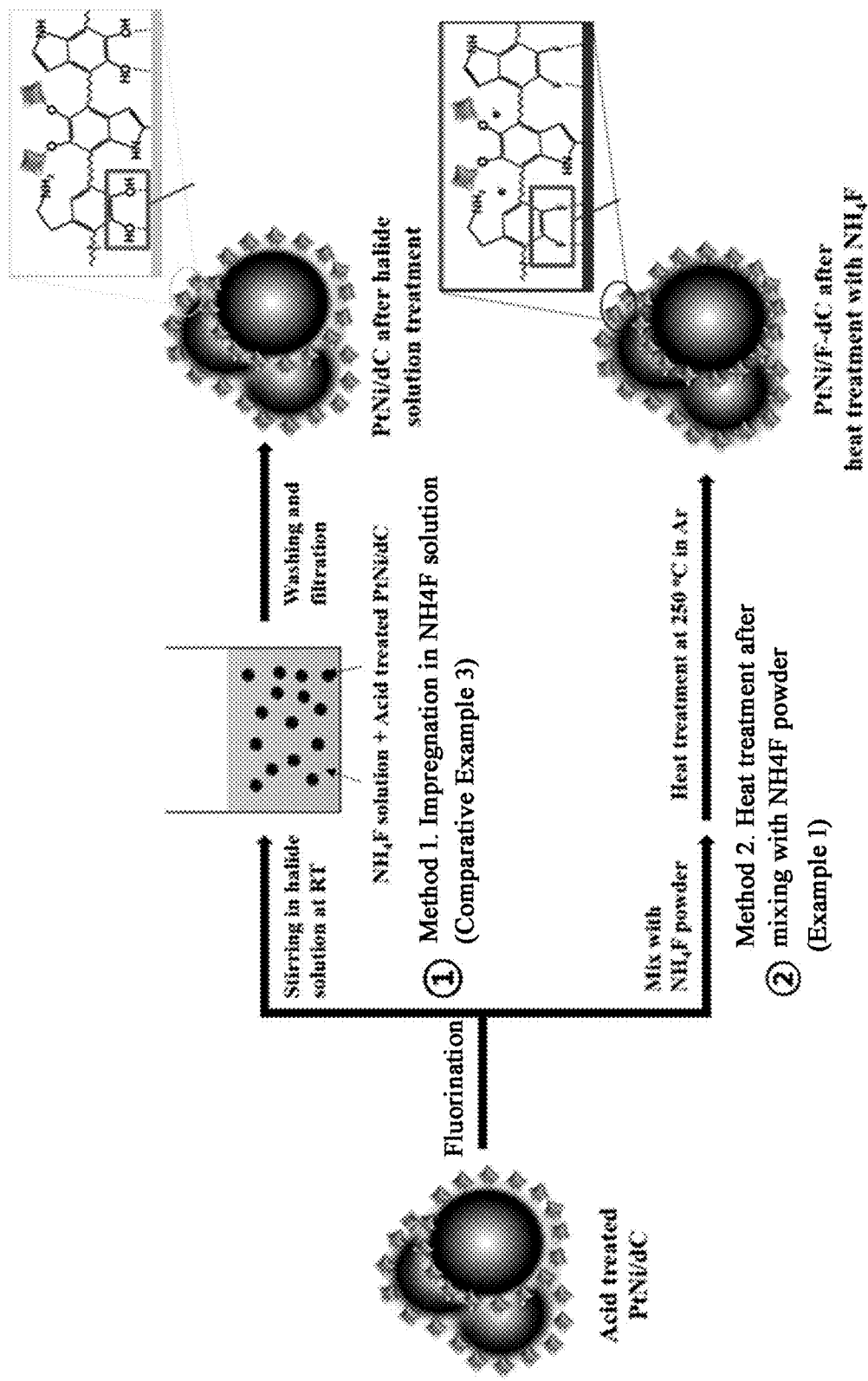
FIG. 9 schematically shows processes of manufacturing fuel cell catalysts according to Example 1 and Comparative Example 3.

In an aspect, the present disclosure provides a fuel cell catalyst including catalyst particles of a platinum-transition metal alloy supported on a polydopamine-coated support, wherein some hydroxyl groups of the catechol groups of the polydopamine are replaced by halogen atoms. The polydopamine-coated support has a hydrophilic surface and may provide high dispersion and high supporting for catalyst particles of platinum-transition metal alloy. However, because the hydroxyl functional groups present in the catechol groups of the polydopamine have adhesivity, they lead to aggregation of catalyst particles during the formation of a catalyst layer of a membrane electrode assembly, thereby inducing nonuniform coating. The nonuniform catalyst layer causes problems in gas permeation and proton ion transfer, consequentially lowering the activity of the membrane electrode assembly. In the present disclosure, some of the hydroxyl groups of the catechol groups are replaced by halogen atoms, so that hydrophilic functional groups such as —NH and —NH$_2$ and hydrophobic halogen atoms exist together on the surface of the catalyst particles, in order to solve the problem of aggregation of the catalyst particles due to the adhesivity of polydopamine. Through this, a membrane electrode assembly having a catalyst layer of high density and high dispersion can be prepared, and satisfactory gas supply and water discharge can be achieved in an electrode layer. This can eventually reduce resistance to mass transfer and improve the performance of the fuel cell including the membrane electrode assembly. 0.1-1% of the hydroxyl groups of the catechol groups of the polydopamine may be replaced by halogen atoms as illustrated in FIG. 9.

In an exemplary embodiment, the transition metal may be one or a mixture of two or more selected from nickel, cobalt, iron, copper, manganese, zinc, titanium, vanadium, chromium, zirconium, molybdenum, tungsten, ruthenium, rhodium, osmium, palladium, silver, gold and iridium. Nickel is preferred in that, particularly when an alloy having the (111) plane is formed with platinum, the activity of oxygen reduction reaction is the highest since the non-reactive oxygen-adsorbing species are suppressed due to the lowest oxygen adsorption energy.

In another exemplary embodiment, the composition ratio of platinum:transition metal (molar ratio of platinum:transition metal) of the platinum-transition metal alloy particles may be selected from 3:1, 2:1, 1:1, 1:2 and 1:3, and the XRD spectrum of the fuel cell catalyst may exhibit a peak for the (111) crystal plane. The platinum-transition metal alloy catalyst having the (111) crystal plane can inhibit the adsorption of the non-reactive OH species as the platinum-platinum bond distance and the electronic structure of platinum is changed by the transition metal and the mass activity of the platinum-based fuel cell catalyst can be maximized since the activity of oxygen reduction reaction can be improved. The platinum-transition metal alloy particles may be prepared to have various shapes (spherical or polyhedral, e.g., tetrahedral, hexahedral, octahedral, etc.) by varying the composition ratio of platinum:transition metal and structural derivatives. For example, the platinum-transition metal alloy particle may be an octahedral particle having the (111) crystal plane wherein the transition metal may be nickel and the composition ratio of platinum:nickel is 3:1.

In another exemplary embodiment, the platinum-transition metal alloy particles may be supported in an amount exceeding 30 wt % based on the polydopamine-coated support. Due to the hydrophilicity of the surface of the polydopamine-coated support, the platinum-transition metal alloy particles achieve high supporting and high dispersion at the same time, which have been difficult to be achieved for the existing fuel cell catalyst. That is to say, the platinum-transition metal alloy particles may be supported in an amount exceeding 30 wt % based on the polydopamine-coated support, and high-level dispersion can be maintained even when the platinum-transition metal alloy particles are supported in such a large amount.

The support may be a carbon-based support. The carbon-based support is not particularly limited. For example, acetylene black, carbon black, etc. may be used.

In another exemplary embodiment, the halogen group may be a fluorine group, and the fuel cell catalyst may exhibit a nitrogen peak with a binding energy of 398-402 eV and a fluorine peak with a binding energy of 686-690 eV in an X-ray photoelectron spectroscopic (XPS) spectrum. In the XPS spectrum, the nitrogen peak with a binding energy of 398-402 eV is derived from —NH and —NH$_2$ functional groups of the polydopamine, and the fluorine peak with a binding energy of 686-690 eV is derived from the fluorine group which replace the catechol group on the surface of the polydopamine.

In another aspect, the present disclosure provides a method for manufacturing a fuel cell catalyst, which includes: a step of pulverizing and mixing a catalyst including a polydopamine-coated support and a halide in solid phase; and a step of heat-treating the catalyst including the polydopamine-coated support and the halide in solid phase, which have been pulverized and mixed.

In the method for manufacturing a fuel cell catalyst, a polydopamine-coated support and a halide are pulverized and mixed, and then heat-treated to induce chemical adsorption whereby the catechol groups of polydopamine are replaced by halogen groups. Since the surface of the polydopamine-coated support has hydrophilic property, high dispersion and high supporting of the active metal can be achieved. In addition, as a part of the surface is made hydrophobic by replacing the adhesive catechol groups with halogen groups during the formation of a catalyst layer of a membrane electrode assembly, aggregation of catalyst particles can be prevented during the formation of the catalyst layer of the membrane electrode assembly. A uniform catalyst layer may be formed as the aggregation of catalyst particles is prevented, which can lead to improvement in resistance to mass transfer and increased fuel cell activity of the membrane electrode assembly. That is to say, after catalyst particles are supported with high dispersion and high supporting of the active metal on the polydopamine-coated support, the aggregation of the catalyst particles is prevented by replacing the catechol groups of polydopamine with halogen groups. The method for manufacturing a fuel cell catalyst of the present disclosure is advantageous in that a solvent is not necessary in the synthesis because the catalyst including the polydopamine-coated support and the halide in solid phase are simply heat-treated by solid-to-solid dry synthesis. In addition, a fuel cell catalyst can be manufactured in short time because a washing process using a solvent and an extraction process for sampling are unnecessary after the synthesis. Since the catechol functional groups of the polydopamine coated on the support are selectively replaced by halogen groups through chemical adsorption, the function of the halogen groups is not lost due to the loss of the halogen groups unlike physical adsorption by simple impregnation.

In an exemplary embodiment, the halide may be one or a mixture of two or more selected from $NH_4F$, $NH_4Cl$, $NH_4Br$ and $NH_4I$. Among them, $NH_4F$ is preferred in that F exhibits the lowest electronegativity from among halogens as well as hydrophobicity. Particularly, if the catechol functional groups on the surface of a polydopamine-coated carbon support are replaced by F, the carbon support surface has both hydrophilic and hydrophobic properties, providing advantages in humidification and water discharge of a membrane electrode assembly.

In another exemplary embodiment, one or a mixture of two or more selected from platinum, nickel, cobalt, iron, copper, manganese, zinc, titanium, vanadium, chromium, zirconium, molybdenum, tungsten, ruthenium, rhodium, osmium, palladium, silver, gold and iridium may be supported on the catalyst including the polydopamine-coated support.

In another exemplary embodiment, the catalyst including the polydopamine-coated support may be a catalyst on which a platinum-transition metal compound is supported, which is prepared by: a step of preparing a mixture solution containing a platinum precursor, a transition metal precursor, a structural derivative and a polydopamine-coated carbon support; and a step of conducting reaction by stirring the mixture solution at 120-200° C. The platinum-transition metal alloy particles having the (111) crystal plane can maximize the mass activity of the platinum-based catalyst as the platinum-platinum bond distance and the electronic structure of platinum is changed by the transition metal, thereby inhibiting the adsorption of the non-reactive OH species and increasing the activity of oxygen reduction reaction. The platinum-transition metal alloy particles may be prepared to have various shapes (spherical or polyhedral, e.g., tetrahedral, hexahedral, octahedral, etc.) by varying the composition ratio of platinum:transition metal and structural derivatives. Accordingly, the platinum-transition metal alloy particles having the (111) crystal plane may be prepared by reacting a platinum precursor, a transition metal precursor and a structural derivative with a polydopamine-coated support at 120-200° C. under stirring, and they may be supported on the polydopamine-coated carbon support.

In another exemplary embodiment, the polydopamine-coated support may be prepared by mixing a carbon support, hydrogen chloride and dopamine in an alkaline aqueous solution of pH 8-9 and stirring the mixture at 20-50° C. for 1-24 hours.

In another exemplary embodiment, the platinum precursor may be one or a mixture of two or more selected from platinum acetylacetonate, platinum acetate and platinum chloride.

And, the transition metal precursor may be one or a mixture of two or more selected from a transition metal acetylacetonate, a transition metal acetate and a transition metal chloride. Specifically, platinum acetylacetonate and a transition metal acetylacetonate may be preferred as the platinum precursor and the transition metal precursor, respectively, in that various shapes (spherical or polyhedral, e.g., tetrahedral, hexahedral, octahedral, etc.) can be embodied.

In another exemplary embodiment, the transition metal may be one or a mixture of two or more selected from nickel, cobalt, iron, copper, manganese, zinc, titanium, vanadium, chromium, zirconium, molybdenum, tungsten, ruthenium, rhodium, osmium, palladium, silver, gold and iridium. Nickel is preferred in that, particularly when an alloy having the (111) plane is formed with platinum, the activity of oxygen reduction reaction is the highest since the non-reactive oxygen-adsorbing species are suppressed due to the lowest oxygen adsorption energy.

In another exemplary embodiment, the molar ratio of platinum and the transition metal (moles of platinum:moles of the transition metal) in the mixture solution may be selected from 3:1, 2:1, 1:1, 1:2 and 1:3.

In another exemplary embodiment, the structural derivative may be benzoic acid. Platinum-transition metal alloy particles prepared using benzoic acid may have an octahedral structure.

In another exemplary embodiment, the support may be a carbon-based support. The carbon-based support is not particularly limited. For example, acetylene black, carbon black, etc. may be used.

In another exemplary embodiment, the heat treatment may be performed by heating at a rate of 0.1-10° C./min to 200-500° C. and maintaining the temperature for 30 minutes to 10 hours.

In another aspect, the present disclosure provides a membrane electrode assembly including the fuel cell catalyst.

In another aspect, the present disclosure provides a fuel cell including the membrane electrode assembly.

Hereinafter, the present disclosure will be described in more detail through examples. However, the following examples are for illustrative purposes only and not intended to limit the scope of this disclosure. It will be obvious to those having ordinary knowledge in the art that the scope of the present disclosure is not limited to the examples and various changes and modifications can be made thereto within the scope of the present disclosure.

Figure 1:
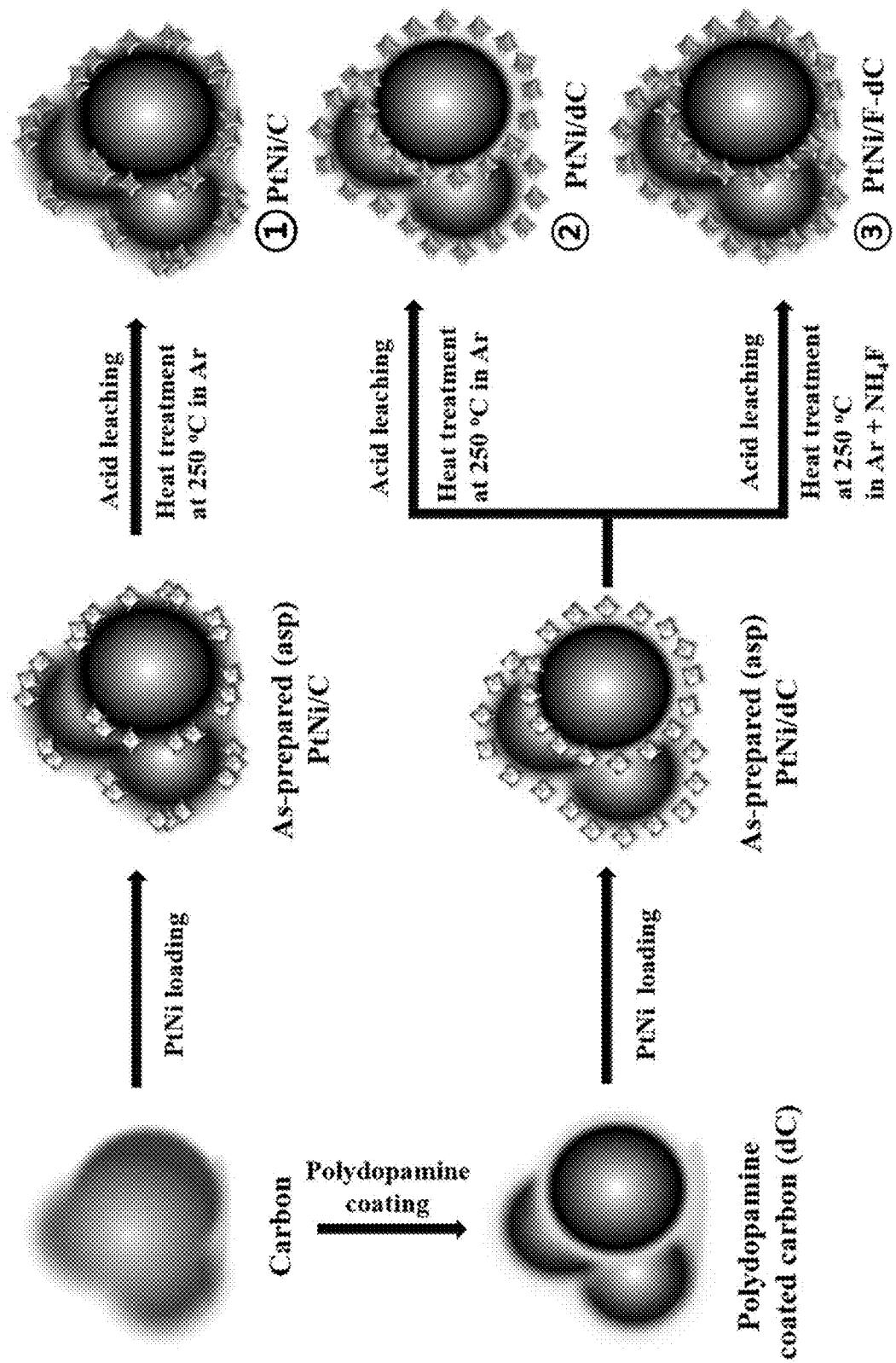
FIG. 1 schematically shows processes of manufacturing fuel cell catalysts according to Example 1 and Comparative Examples 1 and 2.

FIG. 1 schematically shows processes of manufacturing fuel cell catalysts according to Example 1 and Comparative Examples 1 and 2.

Example 1. Preparation of PtNi/F-dC on Polydopamine-Coated Carbon Support Through Fluorination and Heat Treatment Preparation of Polydopamine-Coated Carbon Support 3.3 mmol of pH 8.5 Tris-HCl (Trizma base), 100 μL of HCl (37%), 0.52 mmol of dopamine and 0.1 g of Ketjen-black carbon were dissolved in 150 mL of DI water, and a polydopamine-coated carbon support was prepared by stirring the mixture at room temperature for 12 hours. The polydopamine-coated carbon support was washed several times with ethanol and water and then dried in a vacuum oven at 80° C.

Preparation of Polydopamine-Coated Carbon Support-Based Octahedral PtNi Alloy Catalyst (PtNi/dC)

0.45 mmol of $Pt(acac)_2$, 0.15 mmol of $Ni(acac)_2$ and 6.8 mmol of benzoic acid were dissolved in 30 mL of DMF, and a homogeneous solution was prepared by dispersing 0.1 g of the polydopamine-coated carbon support therein. The homogeneous solution was transferred to a reaction vessel under nitrogen atmosphere and then stirred at 160° C. for 20 hours while heating. The synthesized PtNi/dC (dopamine-coated C) support was washed several times with ethanol and then dried in a vacuum oven at 80° C. vacuum oven.

Figure 2:
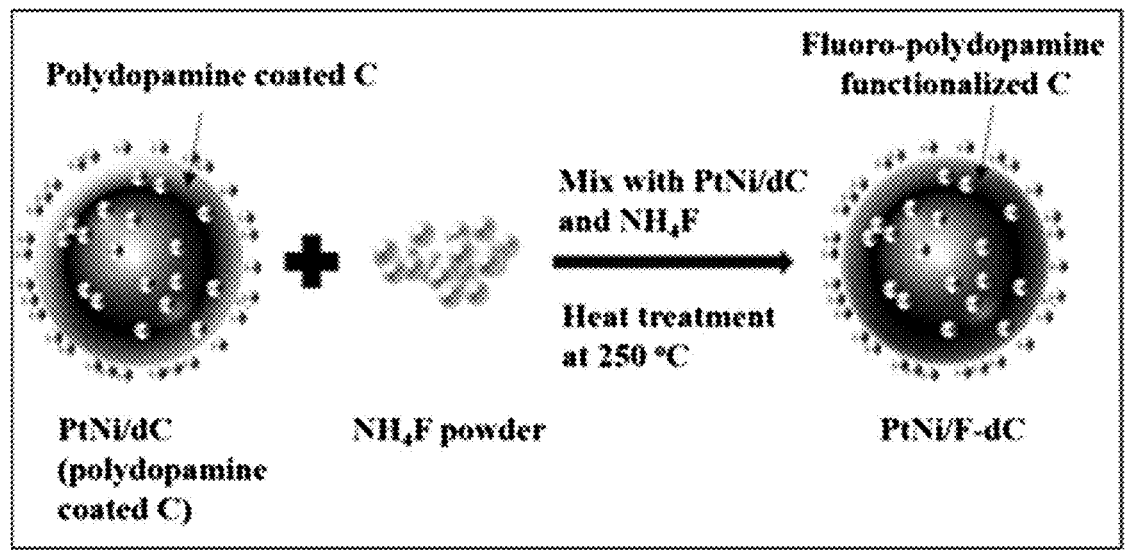
FIG. 2 schematically shows a process of manufacturing a fuel cell catalyst of Example 1 of the present disclosure.

Preparation of PtNi/F-dC Through Fluorination of PtNi/dC Catalyst 0.1 g of the PtNi/dC catalyst and 0.27 mmol $NH_4F$ were pulverized using a mortar and a pestle and then mixed. The PtNi/dC-NH$_4$F mixture was transferred to a quartz tube in a sintering furnace and then nitrogen atmosphere was created. Finally, a catalyst was prepared by heating the sintering furnace to 250° C. at a rate of 5° C./min and then heating for 2 hours. The catalyst was named as PtNi/F-dC. The preparation process of Example 1 is illustrated in FIG. 2.

Comparative Example 1. Preparation of Non-Polydopamine-Coated Support-Based PtNi/C 0.45 mmol of Pt(acac)$_2$, 0.15 mmol of Ni(acac)$_2$ and 6.8 mmol of benzoic acid were dissolved in 30 mL DMF, and a homogeneous solution was prepared by dispersing 0.1 g of a carbon support (Ketjenblack) therein. The homogeneous solution was transferred to a reaction vessel under nitrogen atmosphere and then stirred at 160° C. for 20 hours while heating. The synthesized catalyst was washed several times with ethanol and then dried in a vacuum oven at 80° C. vacuum oven. The catalyst was named as PtNi/C.

Comparative Example 2. Preparation of Polydopamine-Coated Carbon Support-Based PtNi/dC Preparation of Polydopamine-Coated Carbon Support 3.3 mmol of pH 8.5 Tris-HCl (Trizma base), 100 µL of HCl (37%), 0.52 mmol of dopamine and 0.1 g of Ketjenblack carbon were dissolved in 150 mL of DI water, and a polydopamine-coated carbon support was prepared by stirring the mixture at room temperature for 12 hours. The polydopamine-coated carbon support was washed several times with ethanol and water and then dried in a vacuum oven at 80° C.

Preparation of Polydopamine-Coated Carbon Support-Based Octahedral PtNi Alloy Catalyst (PtNi/dC)

0.45 mmol of Pt(acac)$_2$, 0.15 mmol of Ni(acac)$_2$ and 6.8 mmol of benzoic acid were dissolved in 30 mL of DMF, and a homogeneous solution was prepared by dispersing 0.1 g of the polydopamine-coated carbon support therein. The homogeneous solution was transferred to a reaction vessel under nitrogen atmosphere and then stirred at 160° C. for 20 hours while heating. The synthesized catalyst was washed several times with ethanol and then dried in a vacuum oven at 80° C. vacuum oven. The catalyst was named as PtNi/dC.

Comparative Example 3. Preparation of Catalyst by Impregnating Polydopamine-Coated Carbon Support-Based PtNi/dC in Halide Solution (PtNi/dC after Halide Solution Treatment)

0.1 g of PtNi/dC prepared in the same manner as in Comparative Example 2 was mixed with a 0.27 mM NH$_4$F solution. A catalyst was synthesized by stirring the mixture at 30° C. for 10 hours and then filtering the same. The preparation processes of Example 1 and Comparative Example 3 are illustrated in FIG. 9.

Test Example 1. TEM Analysis

Figure 3:
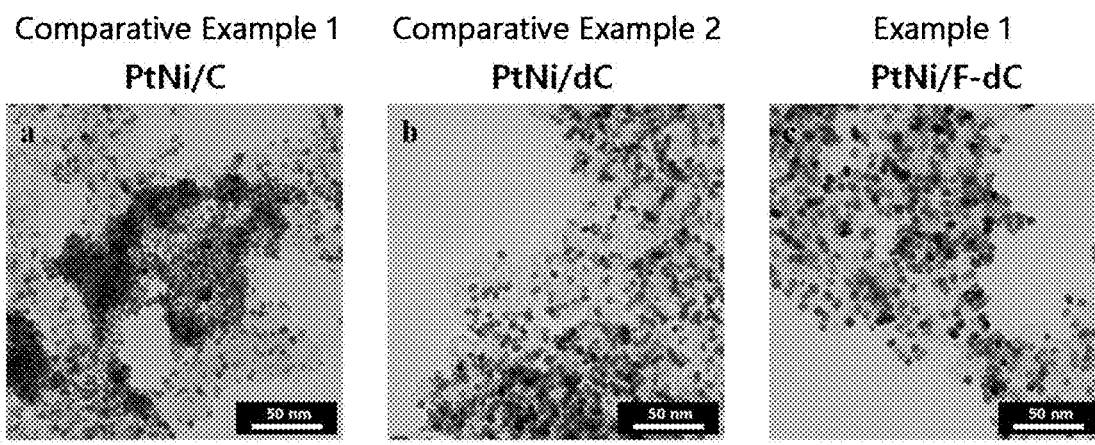
FIG. 3 shows TEM images of fuel cell catalysts manufactured in Example 1 and Comparative Examples 1 and 2.

TEM analysis was conducted on the catalysts prepared in Example 1 and Comparative Examples 1 and 2. FIG. 3 shows TEM images of the catalysts prepared in Example 1 and Comparative Examples 1 and 2. FIG. 3a shows the catalyst prepared in Comparative Example 1, FIG. 3b shows the catalyst prepared in Comparative Example 2, and FIG. 3c shows the catalyst prepared in Example 1. As can be seen from FIG. 3a, aggregation of platinum-nickel alloy particles was observed for the catalyst wherein the non-polydopamine-coated carbon support was used. As can be seen from FIGS. 3b and 3c, the PtNi alloy particles were dispersed uniformly when the polydopamine-coated carbon support was used.

Test Example 2. TGA Analysis and XRD Analysis

Figure 4A:
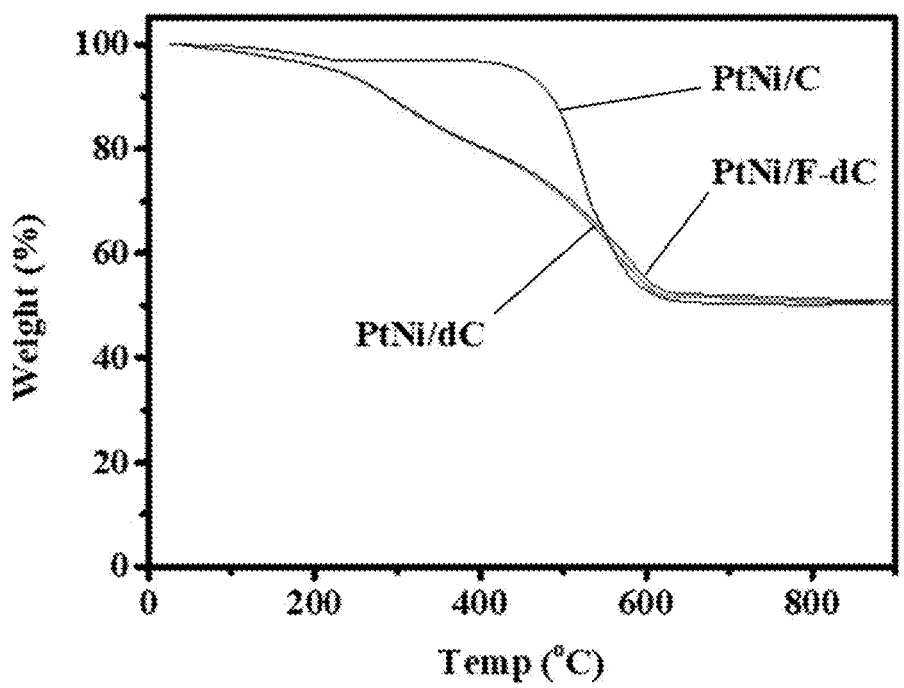
FIG. 4A shows a TGA analysis result of fuel cell catalysts manufactured in Example 1 and Comparative Examples 1 and 2.

The supporting amount of PtNi alloy particles on the catalysts prepared in Example 1 and Comparative Examples 1 and 2 was investigated through TGA analysis. FIG. 4A shows the TGA analysis result for the catalysts prepared in Example 1 and Comparative Examples 1 and 2. As can be seen from FIG. 4A, the supporting amount of PtNi alloy particles on the catalysts prepared in Example 1 and Comparative Examples 1 and 2 was 50 wt %.

Figure 4B:
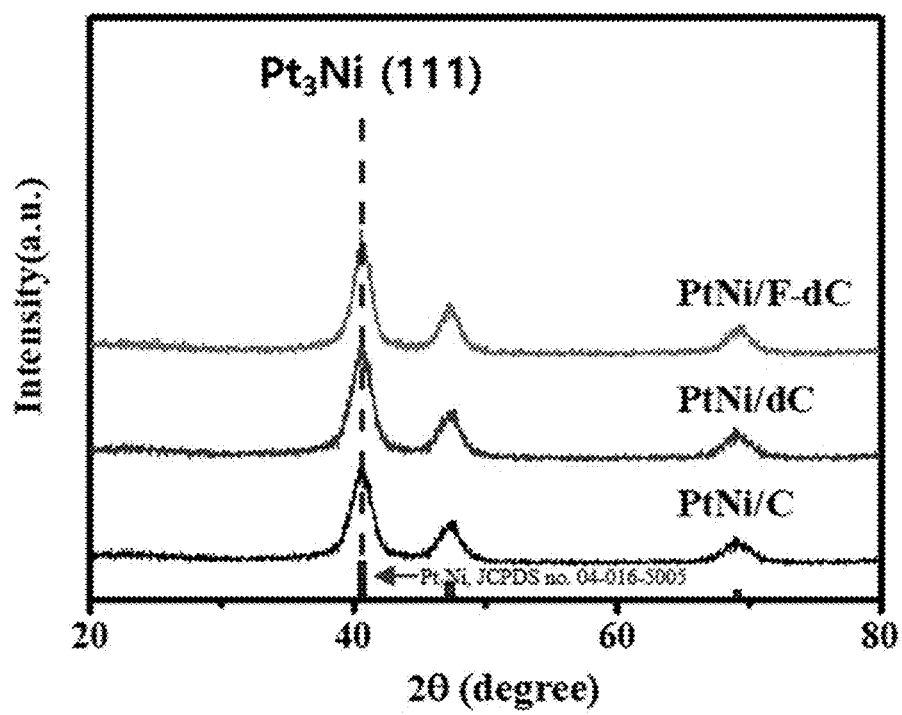
FIG. 4B shows an XRD analysis result of fuel cell catalysts manufactured in Example 1 and Comparative Examples 1 and 2.

In addition, the crystallinity of the catalysts prepared in Example 1 and Comparative Examples 1 and 2 was investigated through XRD analysis. FIG. 4B shows the XRD analysis result for the catalysts prepared in Example 1 and Comparative Examples 1 and 2. As can be seen from FIG. 4B, the catalysts had the Pt$_3$Ni (111) crystal plane at 2θ=40.6°.

Test Example 3. XPS Analysis

Figure 5:
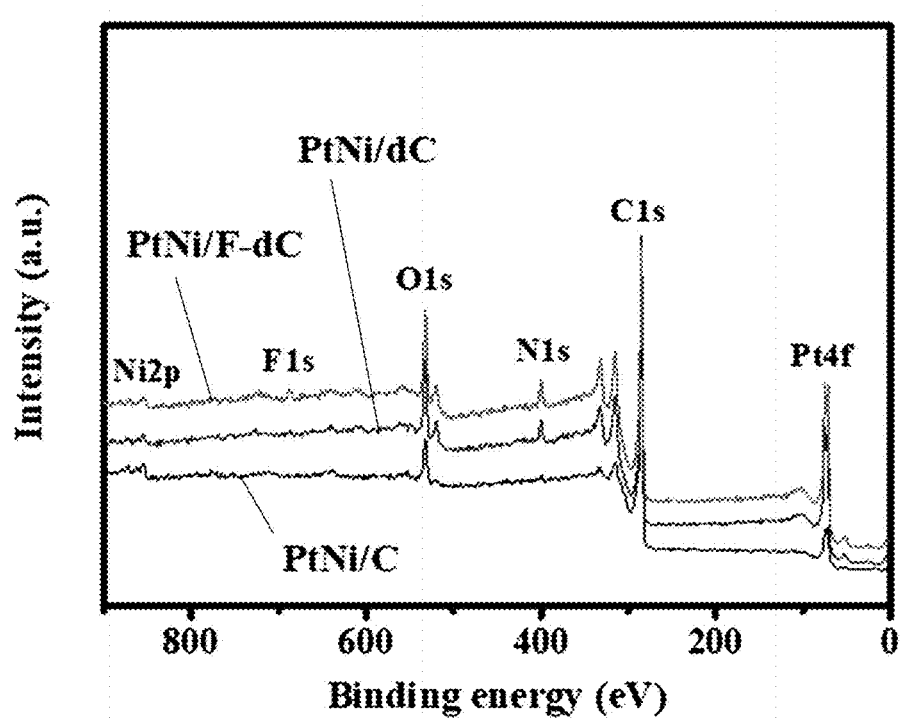
FIG. 5 shows an XPS analysis result of fuel cell catalysts manufactured in Example 1 and Comparative Examples 1 and 2.

XPS analysis was conducted for elemental analysis of the catalysts prepared in Example 1 and Comparative Examples 1 and 2. FIG. 5 shows the XPS analysis result for the catalysts prepared in Example 1 and Comparative Examples 1 and 2.

As can be seen from FIG. 5, the catalysts of Comparative Example 2 (PtNi/dC) and Example 1 (PtNi/F-dC) using the polydopamine-coated carbon support showed the N1s peak with a binding energy of 400.5 eV, which is due to the coating of the polydopamine having —NH and —NH$_2$ functional groups on the carbon surface. The fluorinated catalyst of Example 1 (PtNi/F-dC) showed the F1s peak with a binding energy of binding energy of 688.1 eV.

The XPS analysis is shown in Table 1.

TABLE 1

| | Pt 4f (at. %) | Ni 2p (at. %) | C 1s (at. %) | N 1s (at. %) | O 1s (at. %) | F 1s (at. %) | Total (at. %) |
|---|---|---|---|---|---|---|---|
| Comparative Example 1 | 3.57 | 1.11 | 84.24 | — | 11.08 | — | 100 |
| Comparative Example 2 | 3.16 | 0.97 | 77.15 | 6.09 | 12.63 | — | 100 |
| Example 1 | 3.35 | 1.02 | 78.1 | 7.5 | 9.5 | 0.53 | 100 |

Test Example 4. Evaluation of Performance of Membrane Electrode Assembly

Figure 6A:
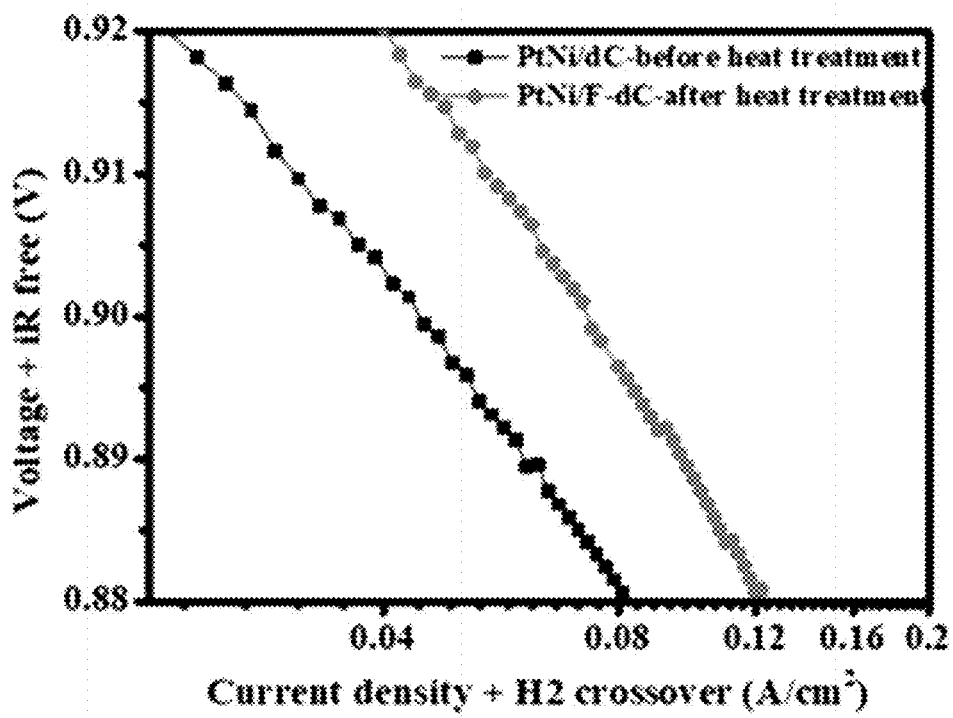
FIG. 6A shows a unit cell performance evaluation result of fuel cell catalysts manufactured in Comparative Example 2 and Example 1.
Figure 6B:
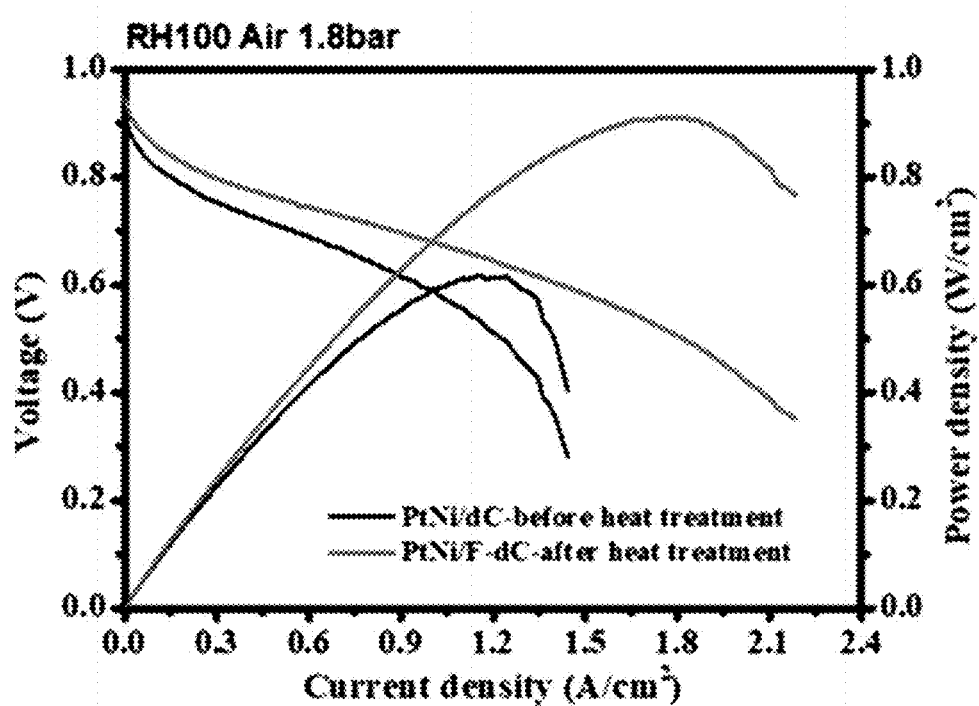
FIG. 6B shows a result of measuring the mass activity of the fuel cell catalysts manufactured in Comparative Example 2 and Example 1.

Membrane electrode assemblies were prepared using the catalysts of Example 1 and Comparative Example 2, and the mass activity and current density of the prepared membrane electrode assemblies were measured. FIGS. 6A and 6B show the results of measuring the mass activity and current density of the membrane electrode assemblies using the catalysts prepared in Example 1 and Comparative Example 2. FIG. 6A shows the unit cell performance evaluation result for the catalysts of Comparative Example 2 (PtNi/dC) and Example 1 (PtNi/F-dC) using the polydopamine-coated carbon support, and FIG. 6B shows the mass activity measurement result for the catalysts of Comparative Example 2 and Example 1.

As can be seen from FIGS. 6A and 6B, the catalyst of Comparative Example 2, which was neither fluorinated nor heat-treated, showed a mass activity of 0.13 A/mg, whereas the catalyst of Example 1, which was fluorinated and heat-treated, showed a mass activity of 0.22 A/mg. In addition, whereas the catalyst of Comparative Example 2 showed a current density of 0.95 A/cm$^2$ at 0.6 V, the catalyst of Example 1 showed a current density of 1.36 A/cm$^2$.

Accordingly, it was confirmed that the membrane electrode assembly prepared using the fluorinated catalyst exhibits remarkably superior performance as compared to the electrode assembly prepared using the unfluorinated catalyst.

Test Example 5. Evaluation of Half-Cell Performance

Figure 7A:
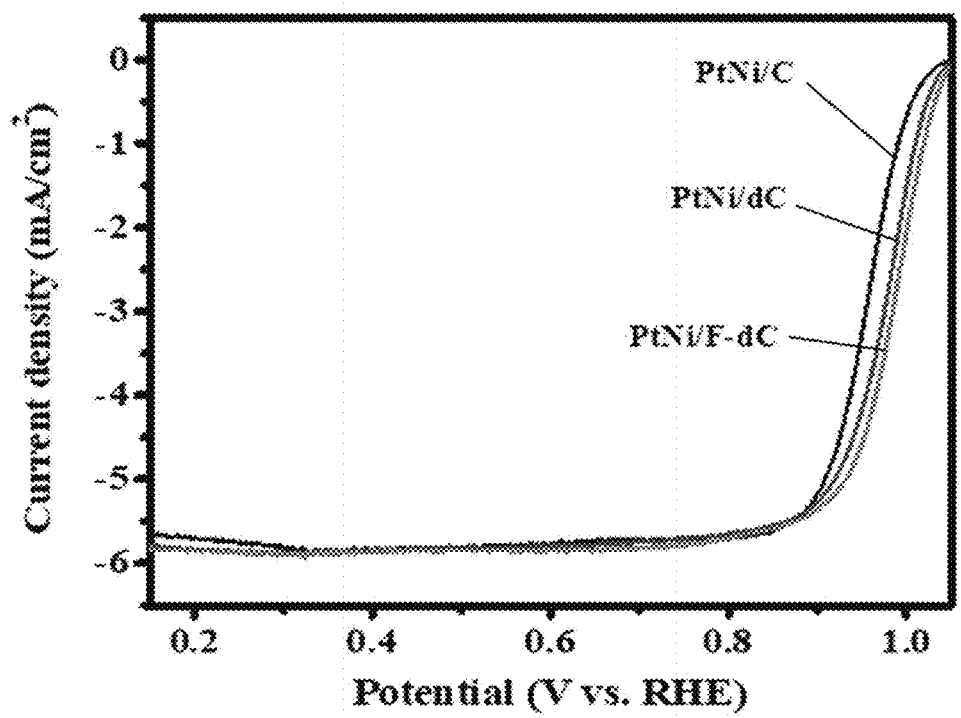
FIGS. 7A and 7B show results of measuring the oxygen reduction reaction activity and mass activity of half-cells using catalysts manufactured in Example 1 and Comparative Examples 1 and 2.
Figure 7B:
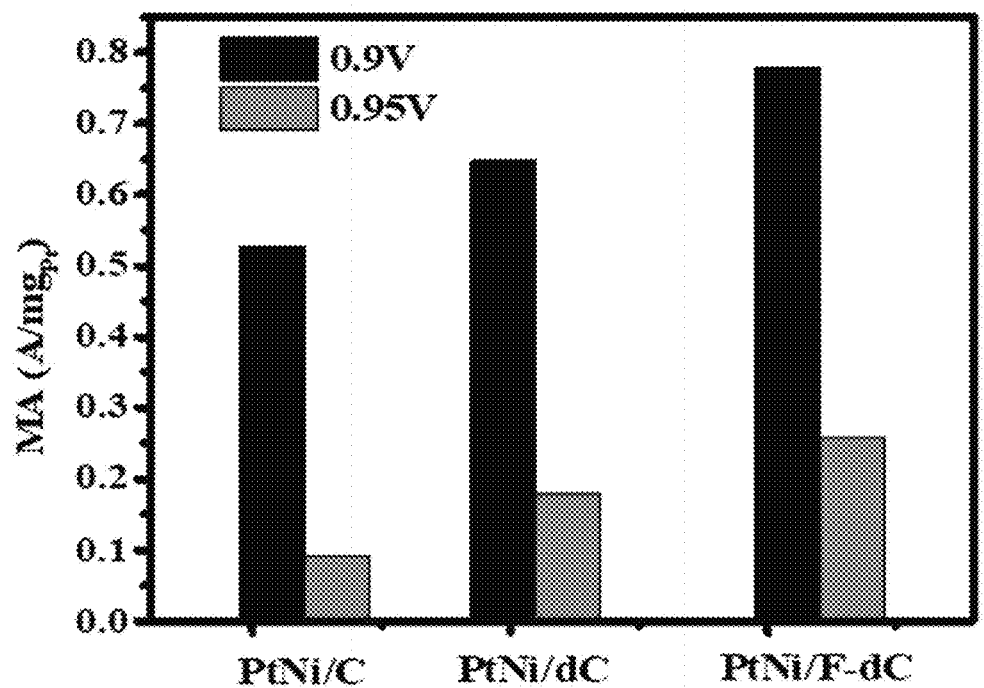

Half-cell performance was evaluated using the catalysts prepared in Example 1 and Comparative Examples 1 and 2. FIGS. 7A and 7B show results of measuring the oxygen reduction reaction activity and mass activity of half-cells using the catalysts prepared in Example 1 and Comparative Examples 1 and 2. FIG. 7A shows the oxygen reduction reaction activity measurement result, and FIG. 7B shows the mass activity measurement result. The oxygen reduction reaction activity measurement result and the mass activity measurement result are shown in Table 2.

TABLE 2

|  | $E_{1/2}$ (V) | Mass activity @ 0.9 V (A/mg$_{Pt}$) | Mass activity @ 0.95 V (A/mg$_{Pt}$) |
|---|---|---|---|
| Comparative Example 1 | 0.954 | 0.528 | 0.091 |
| Comparative Example 2 | 0.975 | 0.648 | 0.179 |
| Example 1 | 0.984 | 0.780 | 0.258 |

As can be seen from FIGS. 7A-7B and Table 2, Example 1, wherein the polydopamine-coated carbon support was used and the catalyst was prepared through fluorination and heat treatment, showed remarkably superior oxygen reduction reaction activity and mass activity as compared to Comparative Example 1, wherein the non-polydopamine-coated carbon support was used, and Comparative Example 2, wherein the polydopamine-coated carbon support was used but fluorination or heat treatment was not conducted.

Test Example 6. SEM Analysis of Membrane Electrode Assembly

Figure 8A:
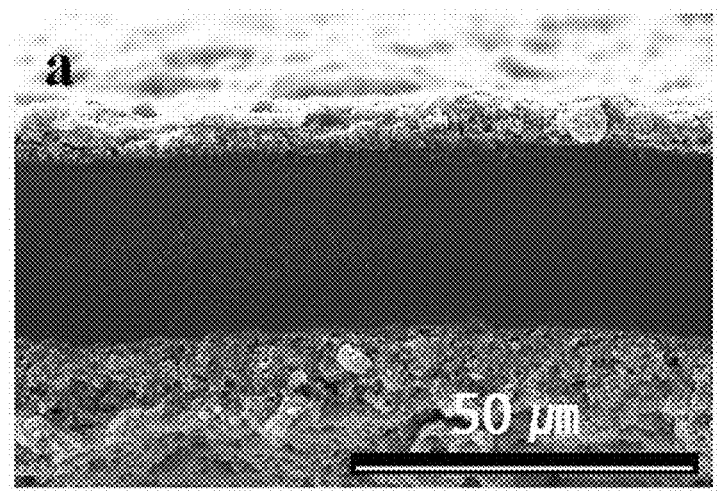
FIGS. 8A to 8F show SEM images of the cross-section of membrane electrode assemblies prepared using catalysts manufactured in Example 1 and Comparative Examples 1 and 2.
Figure 8B:
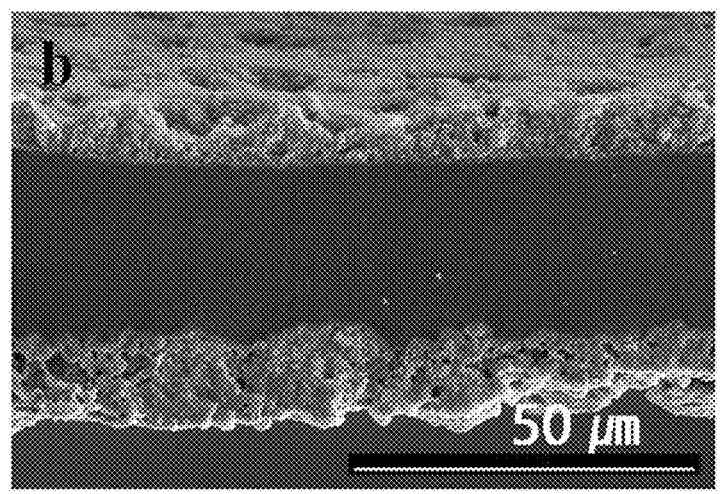
Figure 8C:
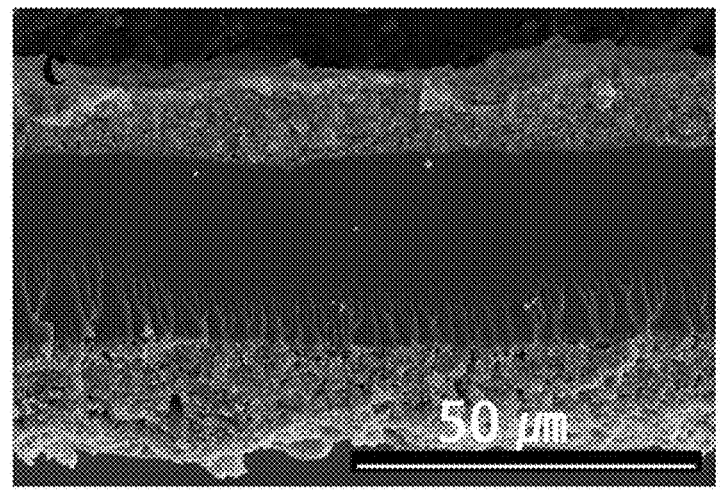
Figure 8D:
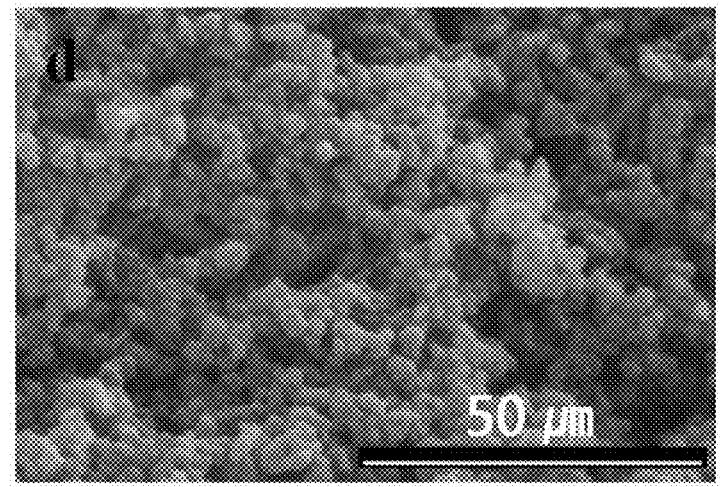
Figure 8E:
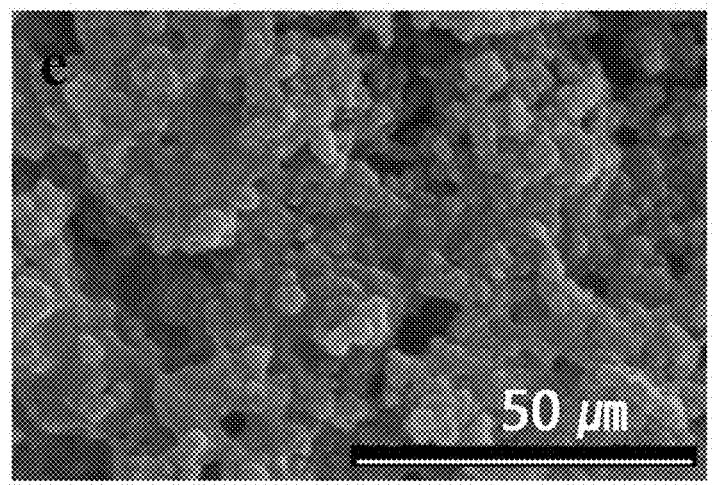
Figure 8F:
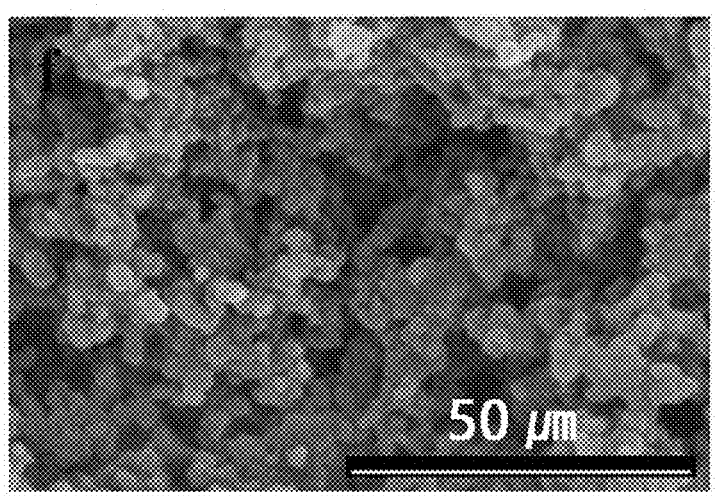

FIGS. 8A to 8F shows the SEM images of the cross-section of the membrane electrode assemblies prepared using the catalysts prepared in Example 1 and Comparative Examples 1 and 2. FIGS. 8A and 8D show the membrane electrode assemblies prepared using the catalyst of Comparative Example 1, FIGS. 8B and 8E show the membrane electrode assemblies prepared using the catalyst of Comparative Example 2, and FIGS. 8C and 8F show the membrane electrode assemblies prepared using the catalyst of Example 1.

As can be seen from FIGS. 8A to 8F, a uniform catalyst layer was formed when the catalyst prepared in Example 1 was used. In contrast, aggregation of particles was observed when the catalysts prepared in Comparative Example 1 and Comparative Example 2 were used, which can deteriorate the performance of the membrane electrode assembly by inducing increased in resistance to mass transfer.

Test Example 7. XPS Analysis

Figure 10:
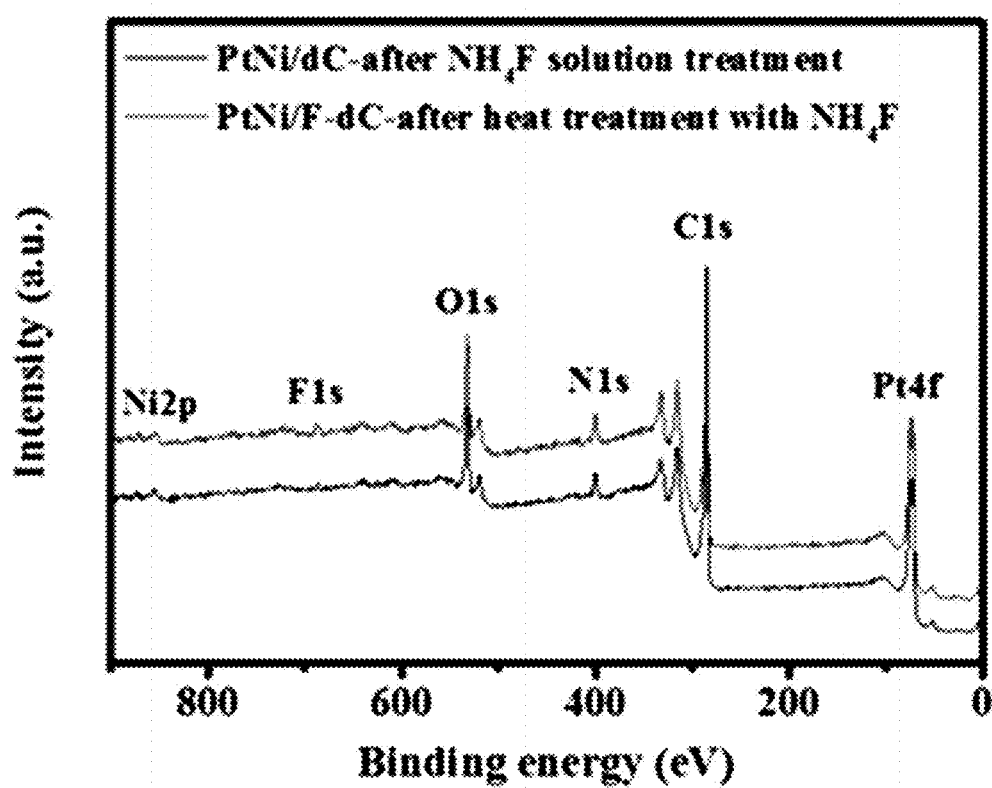
FIG. 10 shows an XPS analysis result of fuel cell catalysts manufactured in Example 1 and Comparative Example 3.

FIG. 9 schematically shows the processes of synthesizing catalysts by impregnating a catalyst including a polydopamine-coated support in a halide solution or by mixing the same with a solid halide powder and then conducting heat treatment (Example 1). FIG. 10 shows the XPS analysis result for the fuel cell catalysts prepared in Example 1 and Comparative Example 3.

As can be seen from FIG. 10, Comparative Example 3 (PtNi/dC) and Example 1 (PtNi/F-dC), wherein the polydopamine-coated carbon support was used as in Comparative Example 2, showed the N1s peak with a binding energy of 400.5 eV, since the polydopamine having —NH and —NH$_2$ functional groups was coated on the carbon surface. However, the —OH functional groups were not replaced by the F functional groups for Comparative Example 3, although the catalyst was impregnated in the halide solution as in Comparative Example 2. The fluorinated catalyst of Example 1 (PtNi/F-dC) showed the F1s peak with a binding energy of 688.1 eV.

The XPS analysis is shown in Table 3.

TABLE 3

|  | Pt 4f (at. %) | Ni 2p (at. %) | C 1s (at. %) | N 1s (at. %) | O 1s (at. %) | F 1s (at. %) | Total (at. %) |
|---|---|---|---|---|---|---|---|
| Comparative Example 3 | 3.08 | 0.95 | 77.3 | 6.1 | 12.57 | — | 100 |
| Example 1 | 3.35 | 1.02 | 78.1 | 7.5 | 9.5 | 0.53 | 100 |

Accordingly, the fuel cell catalyst of the present disclosure can solve the problem of aggregation of catalyst particles that may occur when a catalyst layer is formed using a catalyst including a polydopamine-coated support and can be used to prepare a membrane electrode assembly having a catalyst layer of high density and high dispersion. In addition, the mass activity of the platinum-based fuel cell catalyst can be maximized since the adsorption of the non-reactive OH species can be inhibited and the activity of oxygen reduction reaction can be enhanced as the platinum-platinum bond distance and the electronic structure of platinum is changed by a platinum-transition metal alloy.

The method for manufacturing a fuel cell catalyst of the present disclosure does not require a solvent which is necessary for the solid-to-solid dry synthesis whereby a catalyst including a polydopamine-coated support and a halide in solid phase are simply heat-treated and a fuel cell catalyst can be manufactured in short time because a washing process using a solvent and an extraction process for sampling are unnecessary after the synthesis. In addition, since the catechol functional groups of the polydopamine coated on the support are selectively replaced by halogen groups through chemical adsorption, the function of the halogen groups is not lost due to the loss of the halogen groups unlike physical adsorption by simple impregnation.

While the present disclosure has been described with respect to the specific embodiments, it will be apparent to those skilled in the art that various changes and modifications may be made without departing from the spirit and scope of the disclosure as defined in the following claims.

What is claimed is:

1. A fuel cell catalyst, comprising catalyst particles of a platinum-transition metal alloy supported on a polydopamine-coated support,
wherein the polydopamine includes catechol groups, each catechol group containing hydroxyl groups, and from 0.1-1% of the hydroxyl groups contained in the catechol groups of the polydopamine are replaced by halogen atoms.

2. The fuel cell catalyst according to claim 1, wherein the transition metal is selected from the group consisting of nickel, cobalt, iron, copper, manganese, zinc, titanium, vanadium, chromium, zirconium, molybdenum, tungsten, ruthenium, rhodium, osmium, palladium, silver, gold, iridium, and combinations thereof.

3. The fuel cell catalyst according to claim 1, wherein the platinum-transition metal alloy has a molar ratio of the platinum to the transition metal that is selected from 3:1, 2:1, 1:1, 1:2 and 1:3, and wherein an XRD spectrum of the fuel cell catalyst exhibits a peak for a (111) crystal plane.

4. The fuel cell catalyst according to claim 1, wherein the polydopamine-coated support is a carbon-based support.

5. The fuel cell catalyst according to claim 1, wherein the catalyst particles of the platinum-transition metal alloy are supported on the polydopamine-coated support in an amount exceeding 30 wt % based on weight of the polydopamine-coated support.

6. The fuel cell catalyst according to claim 1,
wherein the halogen is fluorine, and
wherein the fuel cell catalyst exhibits a nitrogen peak with a binding energy of 398-402 eV and a fluorine peak with a binding energy of 686-690 eV in an X-ray photoelectron spectroscopic (XPS) spectrum.

7. A membrane electrode assembly comprising the fuel cell catalyst according to claim 1.

8. A fuel cell comprising the membrane electrode assembly according to claim 7.

* * * * *